United States Patent
Kinnear (10) Patent No.: US 12,121,908 B2
(45) Date of Patent: Oct. 22, 2024

(54) METHOD AND APPARATUS FOR SUSPENSION SEPARATION UTILIZING A HYDRO-GRAVITATIONAL TRAP

(71) Applicant: David J. Kinnear, Fort Mill, SC (US)

(72) Inventor: David J. Kinnear, Fort Mill, SC (US)

( * ) Notice: Subject to any disclaimer, the term of this patent is extended or adjusted under 35 U.S.C. 154(b) by 0 days.

(21) Appl. No.: 17/662,961

(22) Filed: May 11, 2022

(65) Prior Publication Data
US 2023/0241623 A1    Aug. 3, 2023

Related U.S. Application Data

(60) Provisional application No. 63/195,001, filed on May 29, 2021.

(51) Int. Cl.
*C02F 1/00* (2023.01)
*B03B 5/64* (2006.01)

(52) U.S. Cl.
CPC ............... *B03B 5/64* (2013.01); *C02F 1/00* (2013.01); *C02F 2001/007* (2013.01)

(58) Field of Classification Search
CPC .. B03B 5/62; B03B 5/623; B03B 5/64; B03B 5/68; C02F 1/00; C02F 2001/007
See application file for complete search history.

(56) References Cited

U.S. PATENT DOCUMENTS

| | | |
|---|---|---|
| 584,199 A | 6/1897 | Wetzler |
| 1,176,775 A | 3/1916 | Morris |
| 2,118,157 A | 12/1934 | Camp |
| 2,245,587 A | 6/1941 | Hughes |
| 2,380,252 A | 10/1942 | McBride |
| 2,593,036 A | 4/1952 | Koch |
| 3,452,869 A | 7/1969 | O'Neill |
| 3,526,889 A | 8/1970 | Eis |

(Continued)

OTHER PUBLICATIONS

Hazen, A. (1904) On Sedimentation, Transactions American Society of Civil Engineers, vol. 53, Issue 2.

(Continued)

*Primary Examiner* — Michael McCullough
*Assistant Examiner* — Jessica L Burkman
(74) *Attorney, Agent, or Firm* — Lambert Shortell & Connaughton; David J. Connaughton, Jr.; Justin P. Tinger (57) ABSTRACT

The disclosed Hydro-Gravitational Trap (HGT) method and apparatus separate a suspension into two flow streams, discriminating particles based on a designated particle settling velocity: one Designated Particle Concentrated (DPC) and one Designated Particle Diluted (DPD). The HGT confines particles between a controlled upward hydrodynamic field and the downward net gravitational field within the apparatus's High-Energy Segment (HES), awaiting removal. The HES typically contains an internal agitator conforming to its divergent shape. Agitator motion prevents trapped particles from adhering to the HES, provides flocculation energy, and mixes the contents, controlling the DPC flow stream concentration. The agitator can also simultaneously function as a control valve or an actuator regulating this flow in some preferred embodiments. Designated particles remain trapped in the HES until removed with the DPC flow stream while the DPD flow stream advects upward, exiting the apparatus through the top of the Low-Energy Segment (LES).

7 Claims, 13 Drawing Sheets

(56) References Cited

U.S. PATENT DOCUMENTS

| | | | |
|---|---|---|---|
| 6,371,308 B1 | 4/2002 | Zhou | |
| 7,258,788 B2 | 8/2007 | Pollock | |
| 7,314,572 B1 | 1/2008 | Meurer | |
| 9,751,790 B2 | 9/2017 | McCabe | |
| 10,047,342 B2* | 8/2018 | Eibl | A61M 1/3693 |
| 2004/0139988 A1* | 7/2004 | Haubs | B01D 21/245 |
| | | | 134/186 |
| 2006/0108270 A1* | 5/2006 | Kosanda | C02F 1/76 |
| | | | 210/764 |
| 2018/0043370 A1* | 2/2018 | Grimm | B03B 5/623 |

OTHER PUBLICATIONS

De. A. (2017) Shallow Depth Settling (Chapter 14) in Sedimentation Process and Design of Settling Systems. Springer, India.

* cited by examiner

METHOD AND APPARATUS FOR SUSPENSION SEPARATION UTILIZING A HYDRO-GRAVITATIONAL TRAP

CROSS-REFERENCE TO RELATED APPLICATIONS

This application claims priority to and the benefit of the following provisional patent application: 63/195,001 filed 20 May 2021, titled Method and Apparatus for Liquid/Solids Separation Utilizing a Hydrogravitational Trap, which is incorporated herein by reference as if set out in full.

TECHNICAL FIELD

Various fields utilize suspension separation systems. Examples include water treatment, wastewater treatment, and physical processes in many industries ranging from pulp and paper to pharmaceuticals.

BACKGROUND

Engineered water treatment, pollution control, and industrial production processes rely on suspension separation systems to achieve specific pollutant removal and manufacturing objectives. Currently applied device examples include screening, clarification (sedimentation), centrifugation, cyclonation, media filtration, acoustophoresis, and fabric or membrane barrier separation. Each device receives a suspension influent flow stream and typically produces two effluent flow streams: one concentrated and one diluted with respect to the solid phase or a designated segment of the solid phase. These systems separate suspensions by controlling physical phenomena such as fluid or particle motion and energy to transport the solid phase differently from the liquid phase. The solid phase concentrated flow stream collects at a location isolated from the solid phase diluted flow stream.

Existing devices provide a range of separation efficiencies both between devices and within a particular device under different operating conditions. Predicting performance and optimizing these devices presents challenges due to scale differences between full-sized and test devices and the inability to scale suspension properties. Some devices require relatively large surface areas and volumes per unit volume treated, resulting in deep construction despite theoretical calculations beginning with Hazen (1904) determining that no specific depth should be required to separate suspensions. Therefore, many existing devices employed apply high safety factors and suffer from hydraulic inefficiencies negatively impacting both cost and performance.

Most existing devices separate suspensions by transporting a fraction of the solid phase to a physical boundary where they deposit, awaiting physical or hydraulic removal. For example, screens place a barrier in a flow stream to remove material that cannot pass through the screen opening, and clarifiers transport the solid phase via gravity to the floor, where they await removal in a solids or sludge blanket. Solids collected against these barriers do not provide efficient separation physics, limiting liquid-phase transport and creating detrimental complex solid-phase transport requirements, challenging efficiency improvements. Although acoustophoresis systems apply particle trapping, balancing an acoustic field with a flow field, they operate primarily in microfluidic devices in biomedical applications and not in larger-scale systems.

Existing devices produce variable results in different applications and circumstances, considering the desired separation efficiency, capital and operating or life cycle cost, simplicity, durability, reliability, flow stream compatibility, and other engineering factors. No device applies equally well to every separation application. Existing devices often provide suboptimal hydraulic and flocculation efficiency, increasing the cost of separation.

BRIEF DESCRIPTION OF THE DRAWINGS

The drawings illustrate example embodiments of the apparatus and methodology to understand the system's key features. The selected embodiments do not include all potential embodiments and do not limit the apparatus scope concerning other capable embodiments.

The drawings present only features of the apparatus related to the claims and disregard extraneous details. For example, the single separator depicted in the drawings requires ancillary systems to feed a suspension, withdraw the Designated Particle Concentrated (DPC) and Designated Particle Diluted (DPD) flow streams, and possibly actuate specific apparatus components, such as the agitator. Methods exist to accomplish these functions, all applying techniques currently in the public domain. The single Hydro-Gravitational Trap (HGT) depicted in the drawings can also comprise infinite series, parallel, and stacked physical systems of separators with appropriate suspension influent and DPC and DPD piping networks to provide the desired results capacity and performance in full-scale systems.

HGT separation configurations apply to various suspensions in numerous separation applications. The physical properties of these suspensions differ for each application and temporally within a particular application. Therefore, each full-scale HGT application requires a custom-designed configuration based on the properties of the influent suspension and separation objectives. The drawings, therefore, represent only example embodiments and do not indicate absolute dimensions, which vary from application to application.

FIG. 3 applies identical reference identifying numbers as FIG. 2 and as presented in the Detailed Description section of this document.

FIG. 4 applies identical reference identifying numbers as FIG. 2 and as presented in the Detailed Description section of this document.

IDENTIFICATION OF REFERENCE NUMBERS

This document applies the following Reference Numbers to components of the embodiments within the Figures. The relative kinetic energy level (High, Transitional, Low) defines each segment's name because it provides the most effective means to understand the HGT.

100 Suspension Influent
101 High-Energy Segment (HES)
102 Transitional-Energy Segment (TES)
103 Low-Energy Segment (LES)
104 Designated Particle Diluted (DPD) Effluent
105 Agitator
106 Flow Control
107 Designated Particle Concentrated (DPC) Effluent
701 Shaft
702 SPC Regulating Valve

DETAILED DESCRIPTION

This section describes the Hydro-gravitational Trap (HGT) apparatus, a receptacle designed to separate an influent suspension into two flow streams: one Designated Particle Diluted (DPD) and one Designated Particle Concentrated (DPC). Relative kinetic energy defines the three segments comprising an HGT: High, Transitional, and Low. This description initially follows the DPD flow stream before discussing the High-Energy Segment (HES) and DPC flow control and removal.

HGT separator construction from various alternative modern materials does not affect the design, performance, or operating method. The most efficient construction materials would be thin-walled plastic due to cost, low friction coefficient, sufficient strength, lightness, clarity, and durability. Examples of suitable materials include polyethylene terephthalate (PET) or high-density polyethylene (HDPE). Recycled plastic would be sustainable, and transparent plastic would provide beneficial visibility in some embodiments. This disclosure assumes thin-walled plastic receptacle construction if required in the discussion. Intermaterial modifications do not depart from the intent of the claims.

Optimal separator receptacle dimensions and operating methods depend on suspension properties and separation objectives. Ideally, dimensioning should be customized for individual application suspension properties and not generalized even for a particular purpose. Subject to this discussion and claims presented, the shapes depicted in the Figures represent an example HGT separator in terms of the dimensions and agitator configuration but are not necessarily appropriate or optimum for all particle properties and separation objectives. In general, the smaller the diameter of the HGT separator, the greater the capacity increase compared with existing devices, constrained by hydraulics and orifice size, considering the potential presence of undesired influent foreign material.

In this document, the term "particles" denotes a suspension solid phase, typically but not restrictively, in the size range of 1-100 μm. The term includes either individual particles or particle agglomerates, referred to as flocs in the water and other industries, of attached particles that do not appreciably move relative to one another. Particle agglomerates may be in the influent or formed within the apparatus, particularly in the HES. Depending on the objective, the term may refer to the particle count, mass, concentration, or a surrogate such as light penetration. This document generally relates to all parameters unless otherwise stated. Particles can be permanently attached or separated temporally based on the physical environment. Particle settling velocity, an important suspension characteristic, applies primarily to the particle matrix's state after flocculation in the HES.

The influent suspension typically, although not necessarily, contains particles with a distribution of temporally-variable settling velocities and other relevant physical properties. Apparatus design and operating method, frequently supplemented with empirical experimentation, determines effluent particle allocation between the DPC and DPD flow streams. Apparatus design may or may not intend to maximize the retention of particles comprising the complete solid phase in the DPC flow stream. The apparatus retains only certain particles in the DPC flow stream with a settling velocity greater than a designated value realized in the LES while rejecting lower settling velocity particles into the DPD flow stream. Grit removal provides just one example where more influent particles report to the DPD flow stream than the DPC flow stream by design.

Figure 1:
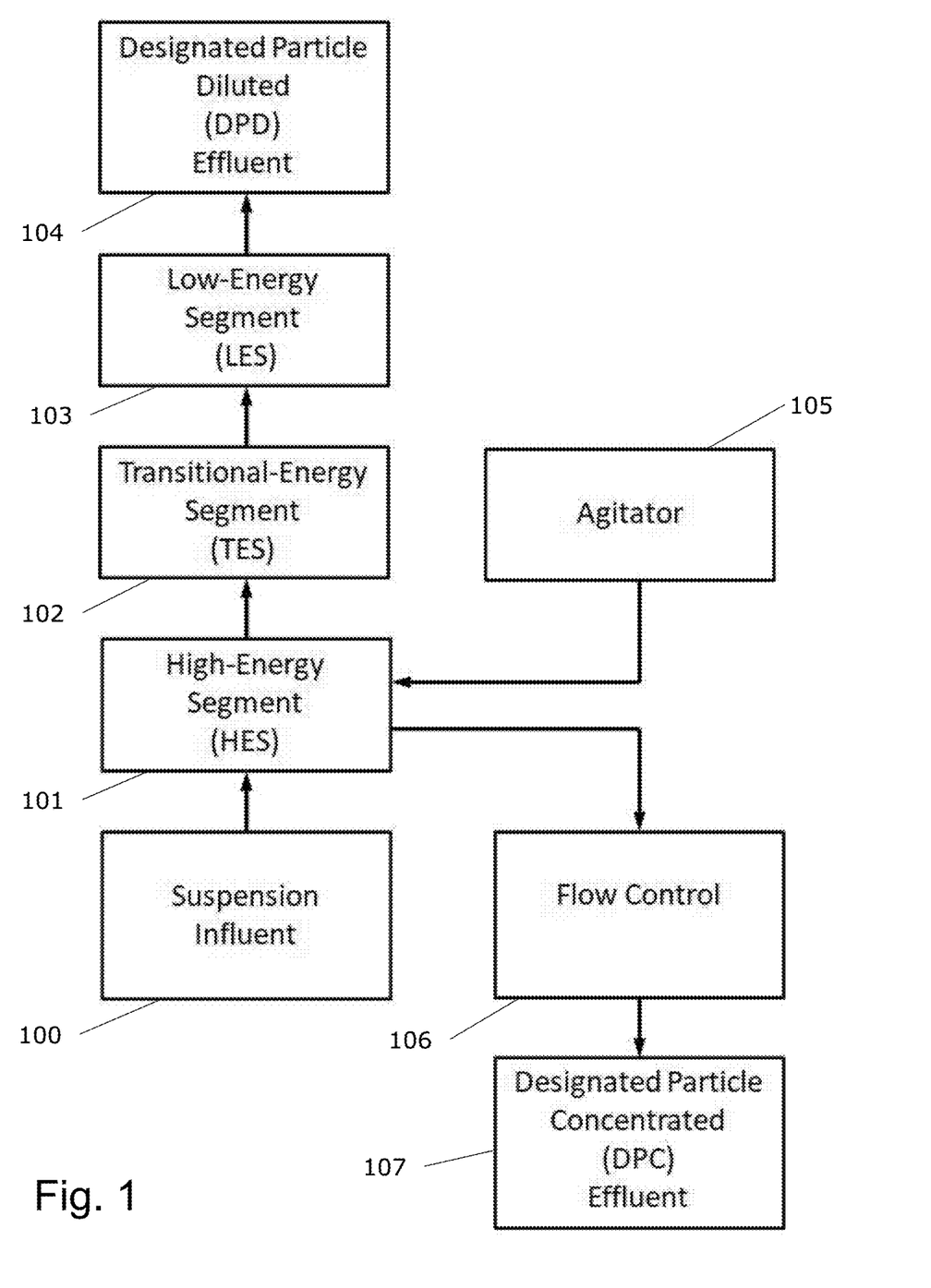
FIG. 1 presents a flow diagram of an HGT separator apparatus indicating how the influent suspension flows through the apparatus and how the effluent DPD and DPC streams exit.

FIG. 1 presents a flow diagram of the HGT separator indicating how the DPC and DPD flow streams progress through the apparatus. A suspension enters the apparatus through an opening at the base, typically but not necessarily fed by gravity, indicated by 100 in FIG. 1. The suspension proceeds directly into the HES, indicated by 101 in FIG. 1. For reasons discussed below, designated particles become trapped in the HES. The DPD flow stream with non-designated particles advects vertically into the Transitional-Energy Segment (TES), indicated by 102 in FIG. 1. The TES provides structural transition, when required, and initiates energy dissipation. The DPD flow stream continues vertically into the Low-Energy Segment (LES), indicated by 103 in FIG. 1. In the LES, energy levels reach the lowest level in the apparatus, approximately equal to the upward kinetic energy of the advective flow with a velocity equal approximately to the desired nominal LES Surface Overflow Rate (SOR). Particles with a flocculated settling velocity greater than this SOR separate from the DPD liquid flow stream and become trapped in the HES. The DPD flow stream exits the apparatus at the top, indicated by 104 in FIG. 1.

Separated particles remain or deposit in the HES, increasing the particle concentration. The HES typically, but not necessarily, comprises a conical shape to provide a gradually decreasing SOR from the influent SOR to the LES SOR. An agitator, indicated by 105 in FIG. 1, typically but not necessarily, conforms to this conical shape and prevents particles from adhering to the HES while simultaneously providing mixing energy. Controlling mixing energy provides an appropriate level of orthokinetic flocculation. Designated particles, trapped and concentrated between the upward hydrodynamic and downward gravitational fields, serve as particle collectors. The controlled particle concentration and HES orthokinetic energy improve flocculation compared to existing devices. DPC flow stream rate control, indicated by 106 in FIG. 1, regulates the HES particle concentration through the overall HGT mass balance and controls the average interparticle distance (IPD) within the HES. Decreased IPD increases flocculation potential. However, too low of an IPD results in particle fluidization due to fluid flow restriction between particles and their associated boundary layers. DPC flow control maximizes flocculation while preventing fluidization, indicated when concentrated particles migrate from the HES into the TES. Various flow control systems could serve an HGT; examples include gravity flow through various valve configurations or a flow-controlled pumped flow. Although not required, a preferred embodiment utilizes the agitator mechanism as a valve or actuator in the flow control system. The DPC flow stream exits the HES, indicated by 107 in FIG. 1, proceeding to downstream processes, uses, or disposal beyond the scope of the present invention.

Figure 2:
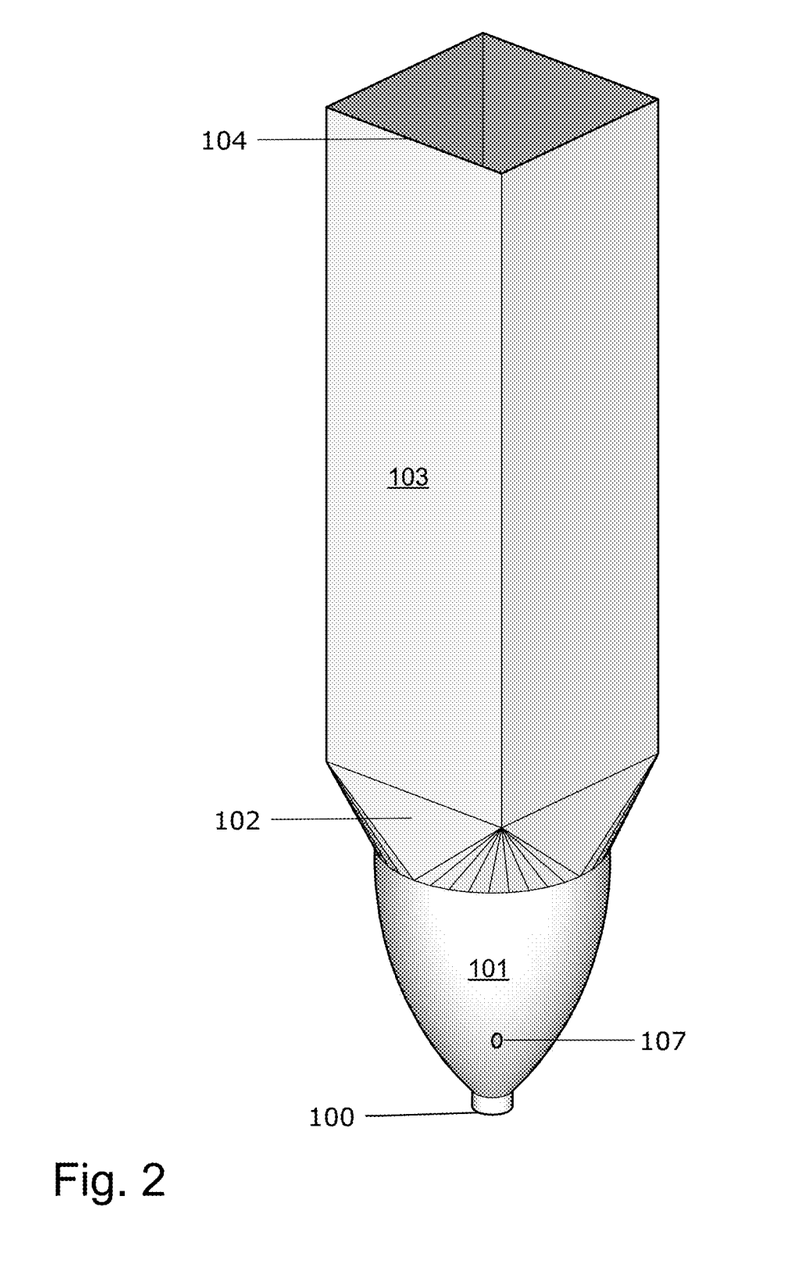
FIG. 2 illustrates an isometric view of an example embodiment of the apparatus with a rectangular Low-Energy Segment (LES) segment with the agitator hidden.

FIG. 2 depicts an isometric view of an example rectangular HGT apparatus. A suspension enters the apparatus at the base, indicated by 100 in FIG. 2. Flow proceeds directly into the HES, indicated by 101 in FIG. 2. Designated particles remain trapped in the HES while the DPD flow stream advects upward into the TES, depicted by 102 in FIG. 2. The DPD flow stream further advects upward into the LES, depicted by 103 in FIG. 2. DPD flow exits the apparatus at the top, depicted by 104 in FIG. 2. In the example embodiment shown, the LES provides a structural transition from the circular perimeter of the HES top to the rectangular perimeter of the LES.

A suspension to be separated enters the HGT separator at the base, directed vertically upward along the centerline, indicated by 200 in FIG. 2. A pipe typically conveys the suspension. The influent pipe size results in a relatively high upward velocity or SOR and a resultant Reynolds Number in the transitional or low turbulent flow regime. All influent particles remain fully entrained in the fluid.

An influent suspension proceeds vertically into the HES of the apparatus, indicated by 101 in FIG. 2. The HES comprised a divergent receptacle frequently, but not essentially, resembling a conically shaped, inverted bell-shaped, straight cone, or inverted De Laval rocket engine cone with a similarly high expansion angle. A mechanical agitator, indicated by 105 in FIG. 7, typically, but not essentially, rotates or reciprocates within the HES and conforms to its shape.

As an influent fluid control volume elevation increases above the suspension influent opening, the streamwise projected surface area also increases, decreasing the upward fluid velocity. The water treatment industry uses the term Surface Overflow Rate (SOR) with units of gallons per day per square foot (U.S.) and meters per hour (S.I.). This document uses SOR and the more generic term "upward fluid velocity" interchangeably. Unless specifically described, the SOR refers to the nominal SOR as the average SOR at a particular elevation neglecting the effects of wall friction and any resultant velocity profile.

Suspension particles remain entrained in the carrier fluid, frequently but not necessarily water, until the upward fluid velocity decreases to the settling velocity of a particular particle. Particles then separate from the flow stream and, theoretically, would remain suspended in an ideal flow field. Therefore, an HGT separator traps particles in the HES by balancing the upward fluid velocity field with the downward particle settling resulting from the gravitational field, preventing motion.

When the DPD flow stream proceeds vertically from a typically circular circumference HES into a non-circular circumference LES, a TES indicated by 102 in FIG. 2 provides the structural transition. The TES transforms the projected circular shape in the HES into the LES shape, such as the rectangular shape indicated by 103 in FIG. 2. For example, this transition permits a typically conical HES to be agitated by a rotating mechanical agitator. The overlying LES can then maximize the projected cross-sectional surface area in different applications while providing DPD and DPC feed and withdrawal piping and DPD fluid flow in the interstitial space. This description describes a rectangular LES embodiment, as depicted in FIG. 2 but later presents example drawings of other embodiments.

Fluid flow advects vertically into the LES, depicted by 103 in FIG. 2. Designated particles, which settle more rapidly than the upward fluid velocity, separate from the flow field and remain trapped in the HES. Flow proceeds through the LES to the DPD effluent indicated by 104 in FIG. 2. Flow exits into the bulk fluid flow of a container, into a pipe, or over a weir depending on the physical separator configuration in a system and beyond the scope of the apparatus description.

This description continues by providing details of the HES. As described, particles accumulate and remain suspended in the HES, decreasing the IPD and increasing particle concentration. If operated without an agitator, trapped particles adhere to the receptacle, stagnating due to the no-slip boundary condition, complicating or preventing removal. Therefore, a mechanical agitator typically, but not necessarily, operates in the HES to prevent particle adherence and the resultant stagnation. The agitator also provides appropriate energy, improving flocculation and mixing the contents to permit a consistent withdrawal concentration in the DPC flow stream. An example agitator, depicted by 105 in FIG. 7, could be a mechanical four-arm stirrer, but other mechanical methods or means of agitation could also be effective. FIG. 8 depicts an isometric view of an example mechanical agitator without the containment vessel. The agitator shown rotates or reciprocates with a shaft indicated by 701 in FIG. 7 connected to an overlying motor, but many alternative drive systems could be effective. For example, a stepper motor would effectively drive the agitator.

Controlling the mechanical agitator's rotational velocity prevents particles from adhering to the wall while ensuring orthokinetic energy dissipates within the TES and LES. The resultant mixing also provides orthokinetic energy appropriate for flocculation. All particles entering the HGT base must traverse a controlled concentration and energy region in the HES before entering the overlying TES. Controlling flocculation in this manner improves the performance of an HGT system compared to existing systems.

Mixing ensures that all particles trapped in the HES can be removed in the DPC effluent, as indicated by 107 in FIG. 2. Particles remained trapped and mixed within the HES until withdrawn from the HGT separator. DPC removal can occur either through the side outlet, as depicted as 107 in FIG. 2, or temporally through the inlet, depicted as 100 in FIG. 2.

Figure 7:
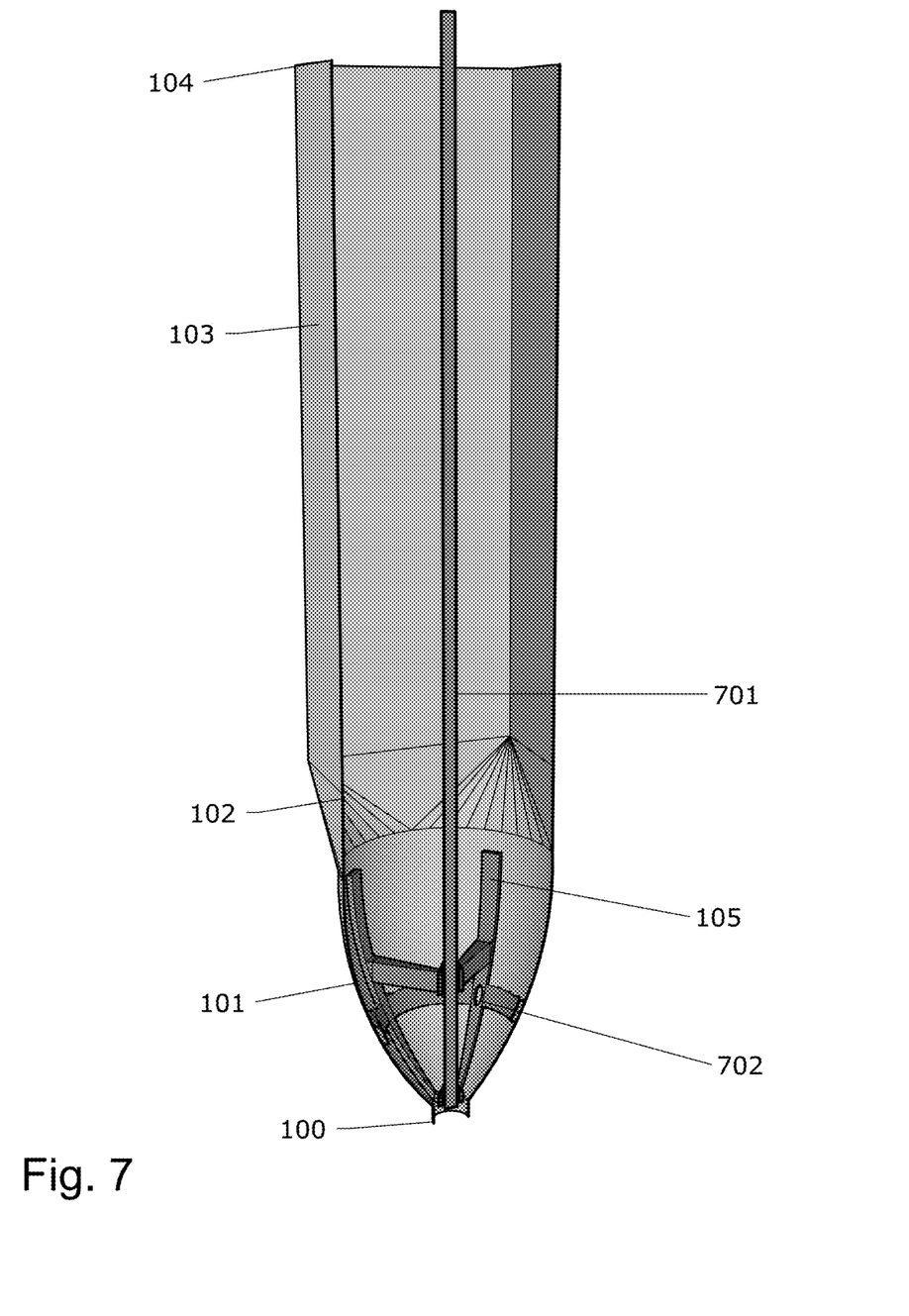
FIG. 7 illustrates an isometric sectional view of an example rectangular LES embodiment of the apparatus illustrated in FIG. 2 with the agitator shown.
Figure 8:
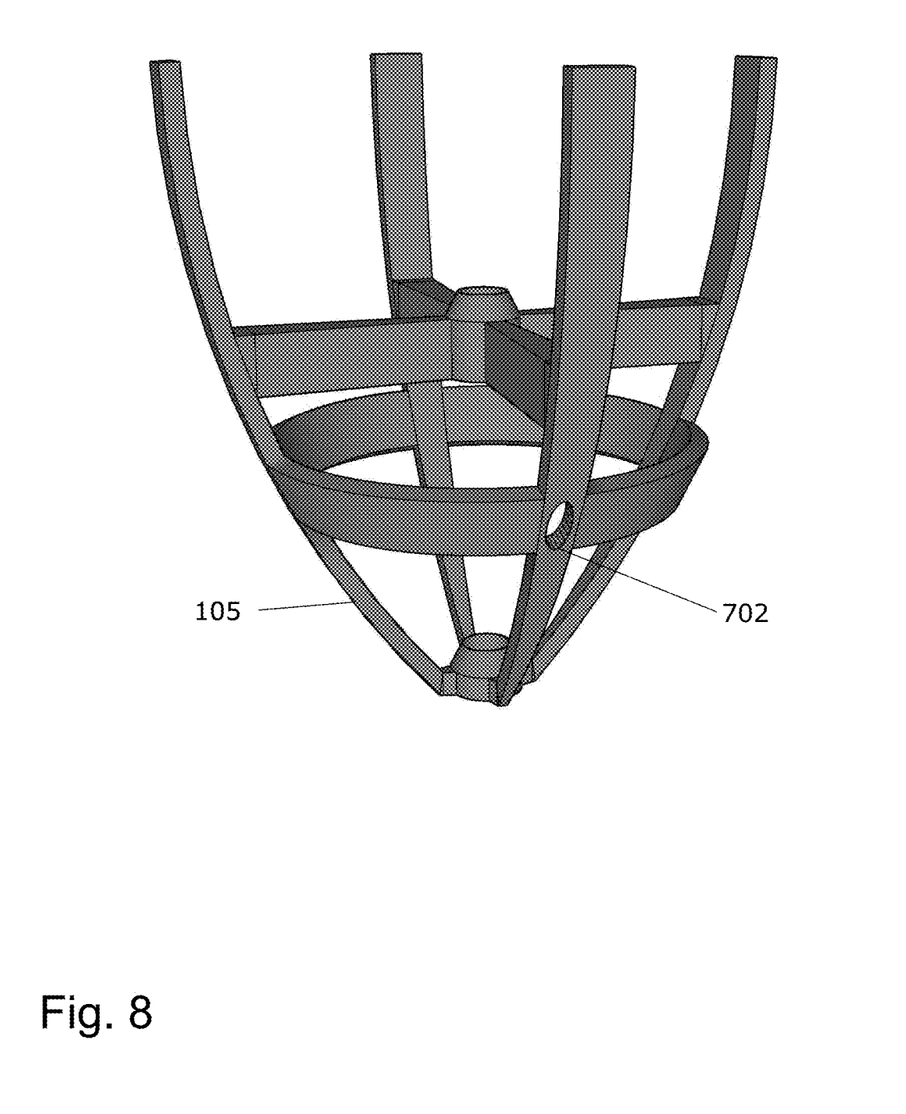
FIG. 8 illustrates an isometric view of an example agitator.

In preferred embodiments, the agitator also functions as a valve to regulate the DPC flow stream, depicted by 702 in FIG. 7. In other embodiments, the agitator functions as an actuator of a valve that regulates this flow. In the embodiment depicted in FIG. 7, the actuator seals the DPC flow stream by design against the DPC removal outlet, depicted as 105 in FIG. 7, until the agitator opening 702 aligns, allowing flow to proceed. The agitator reciprocates in non-aligned positions unless removing the DPC flow stream. At this time, alignment occurs to permit the DPC flow stream flow. The agitator then resumes reciprocation.

Figure 3:
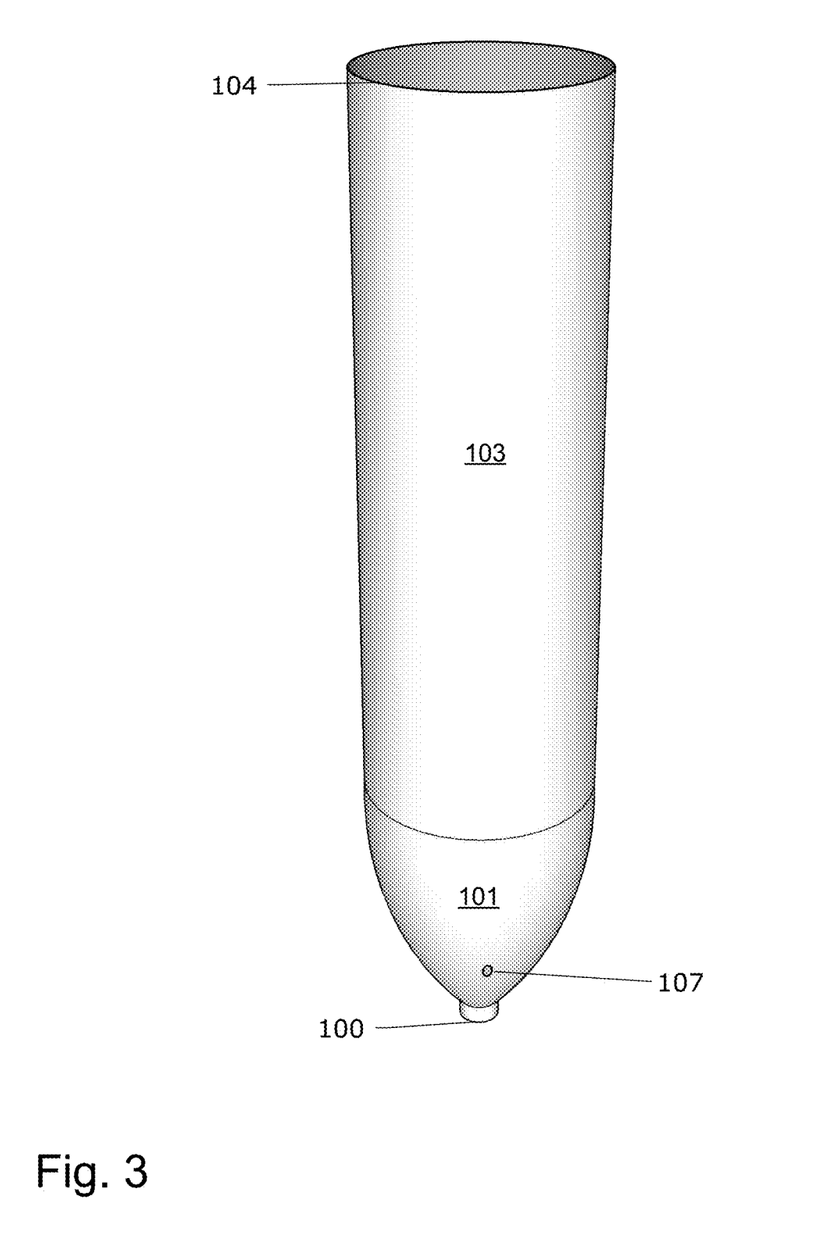
FIG. 3 illustrates an isometric view of an example embodiment of the apparatus with a circular LES and the agitator hidden. This disclosure does not illustrate additional views of this embodiment but uses the rectangular LES embodiment presented in FIG. 2 as a representative example.

FIG. 3 depicts an isometric view of an example HGT embodiment with a circular LES. Although the TES requires the same shape connecting the HES and the LES, a transitional energy state does occur within the receptacle. FIG. 3 employs identical reference numbers as FIG. 2.

Figure 4:
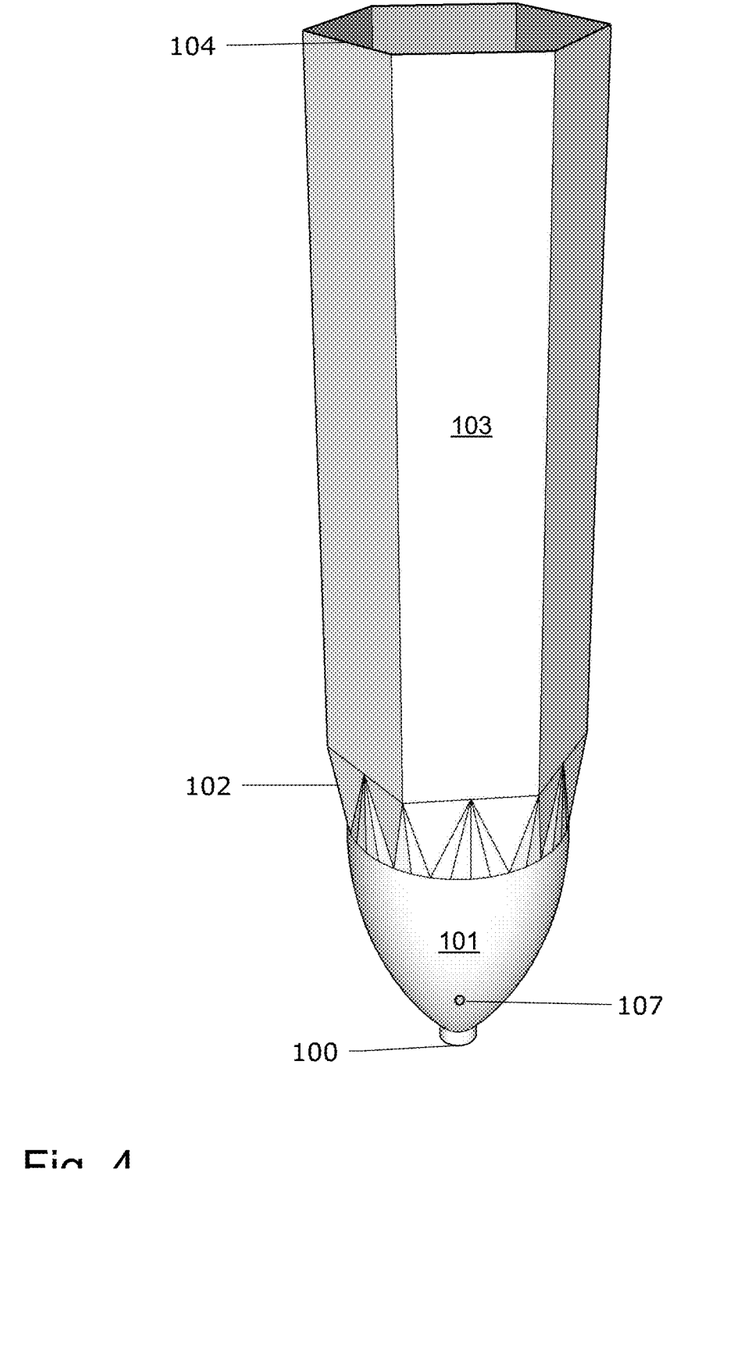
FIG. 4 illustrates an isometric view of an example embodiment of the apparatus with a hexagonal LES and the agitator hidden. This disclosure does not illustrate additional views of this embodiment but employs the rectangular LES embodiment presented in FIG. 2 as a representative example.

FIG. 4 depicts an isometric view of an example HGT embodiment with a hexagonal LES requiring a structural transition in the TES. FIG. 4 employs identical reference numbers as FIG. 2.

Figure 5:
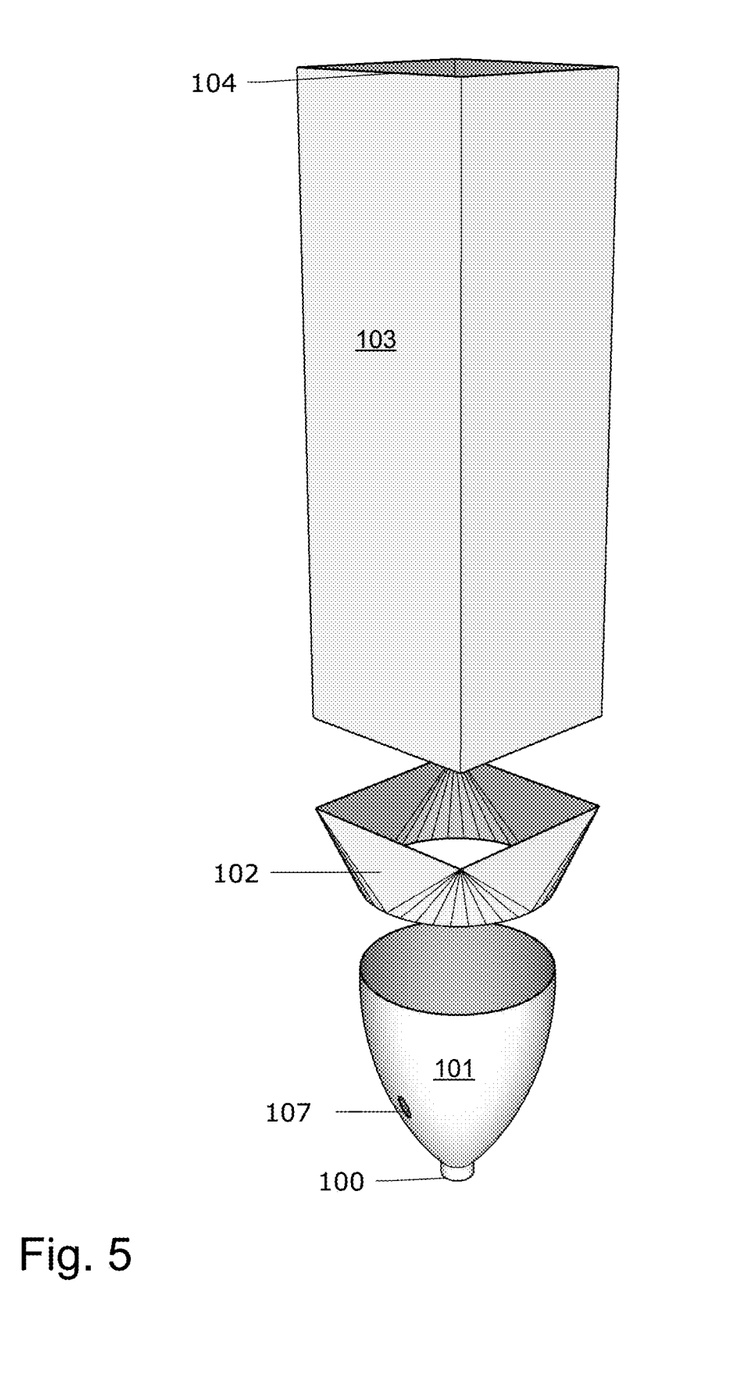
FIG. 5 illustrates an isometric exploded view of an example rectangular LES embodiment of the apparatus illustrated in FIG. 2 with the agitator hidden.

FIG. 5 depicts an exploded isometric view of the rectangular LES example embodiment HGT separator depicted in FIG. 3, with the individual segments separated.

Figure 6:
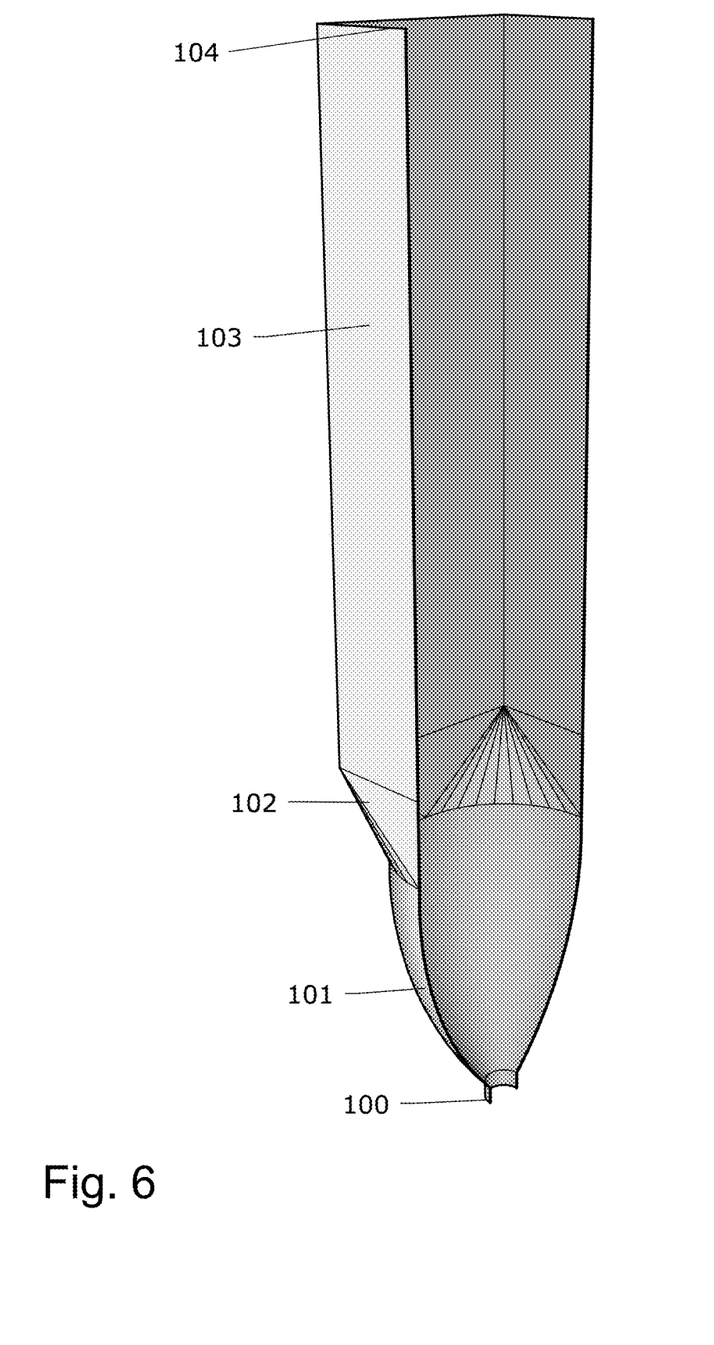
FIG. 6 illustrates an isometric sectional view of an example rectangular LES embodiment of the apparatus illustrated in FIG. 2 with the agitator hidden.

FIG. 6 depicts an isometric sectional view of the rectangular LES example embodiment HGT separator depicted in FIG. 3, with the agitator removed.

FIG. 7 depicts an isometric sectional view of the rectangular LES example embodiment HGT separator depicted in FIG. 3.

FIG. 8 presents a close-up of the example embodiment of the agitator depicted in FIG. 7.

Figure 9:
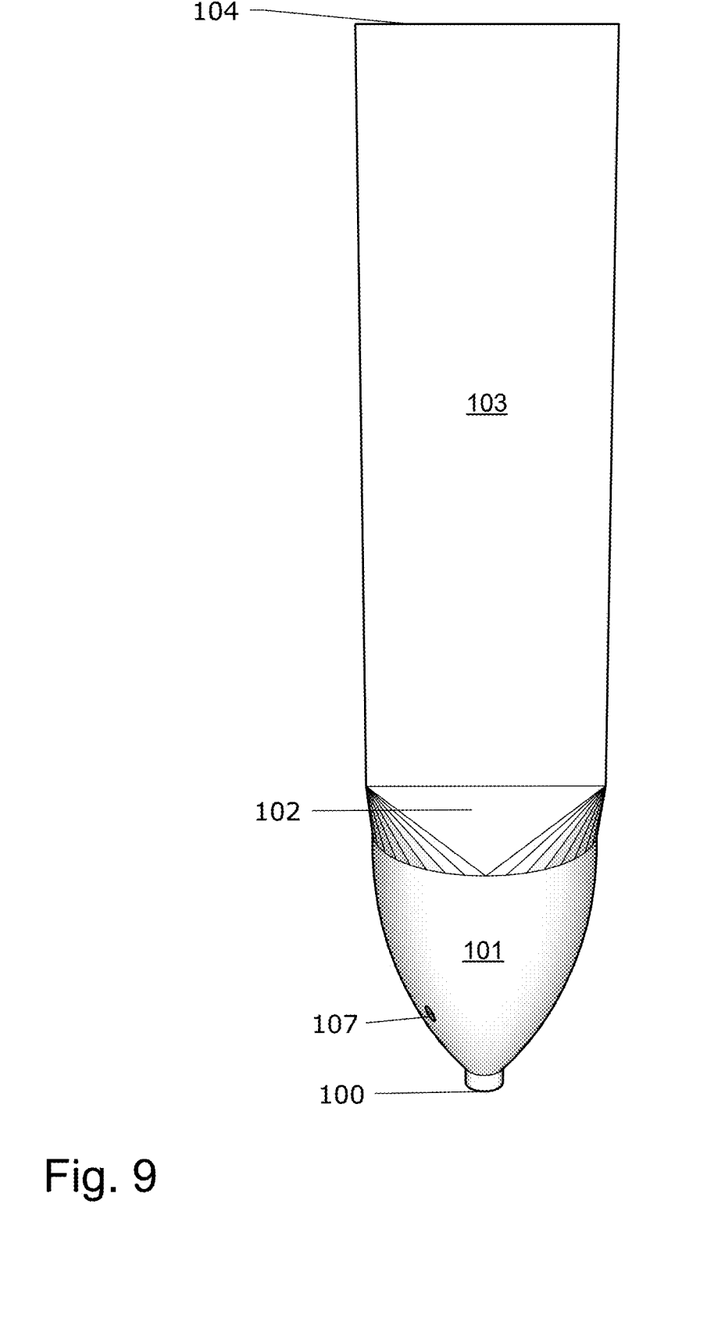
FIG. 9 illustrates a front view of an example rectangular LES embodiment of the apparatus illustrated in FIG. 2 with the agitator hidden.

FIG. 9 presents a side view of the rectangular LES example embodiment HGT separator depicted in FIG. 3.

Figure 10:
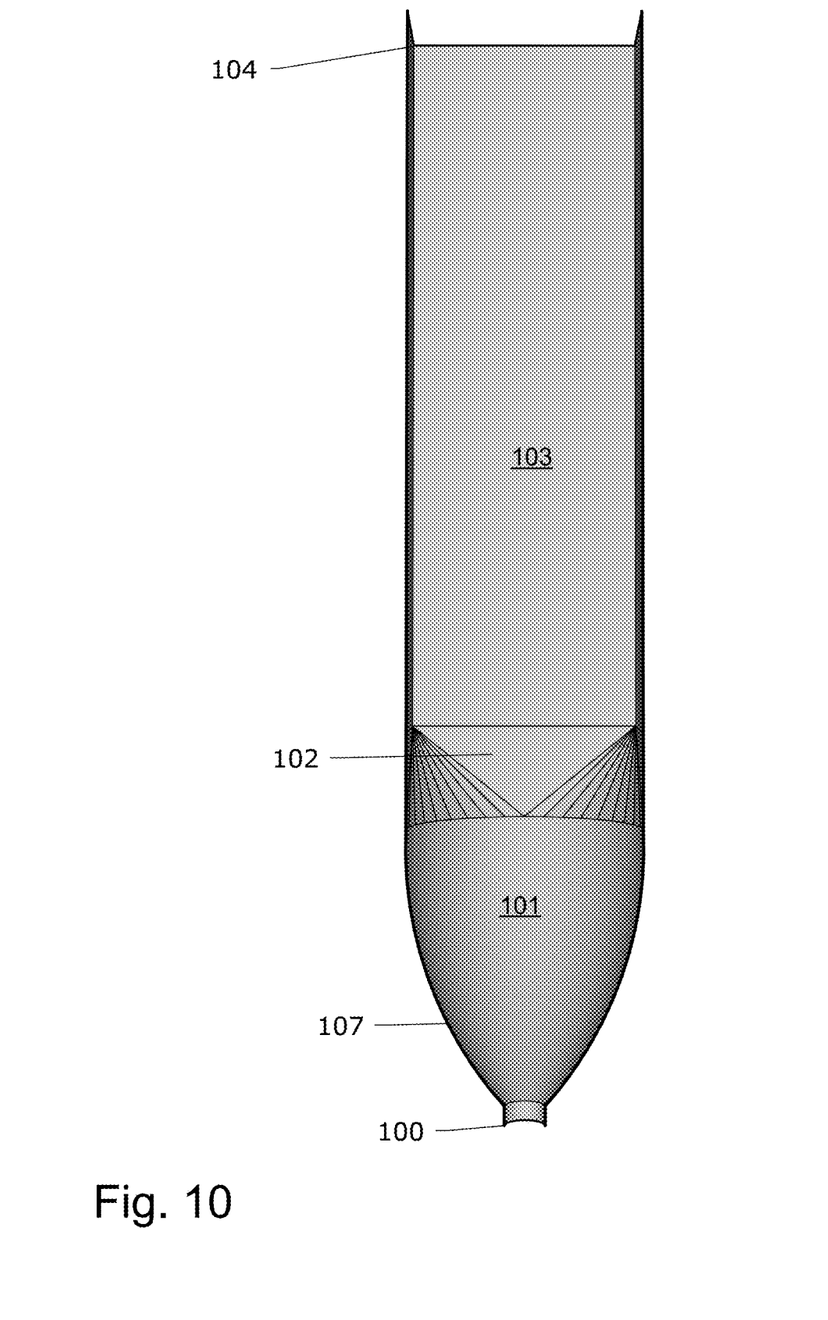
FIG. 10 illustrates a front sectional view of an example rectangular LES embodiment of the apparatus illustrated in FIG. 2 with the agitator hidden.

FIG. 10 presents a side sectional view of the rectangular LES example embodiment HGT separator depicted in FIG. 3, with the agitator hidden.

Figure 11:
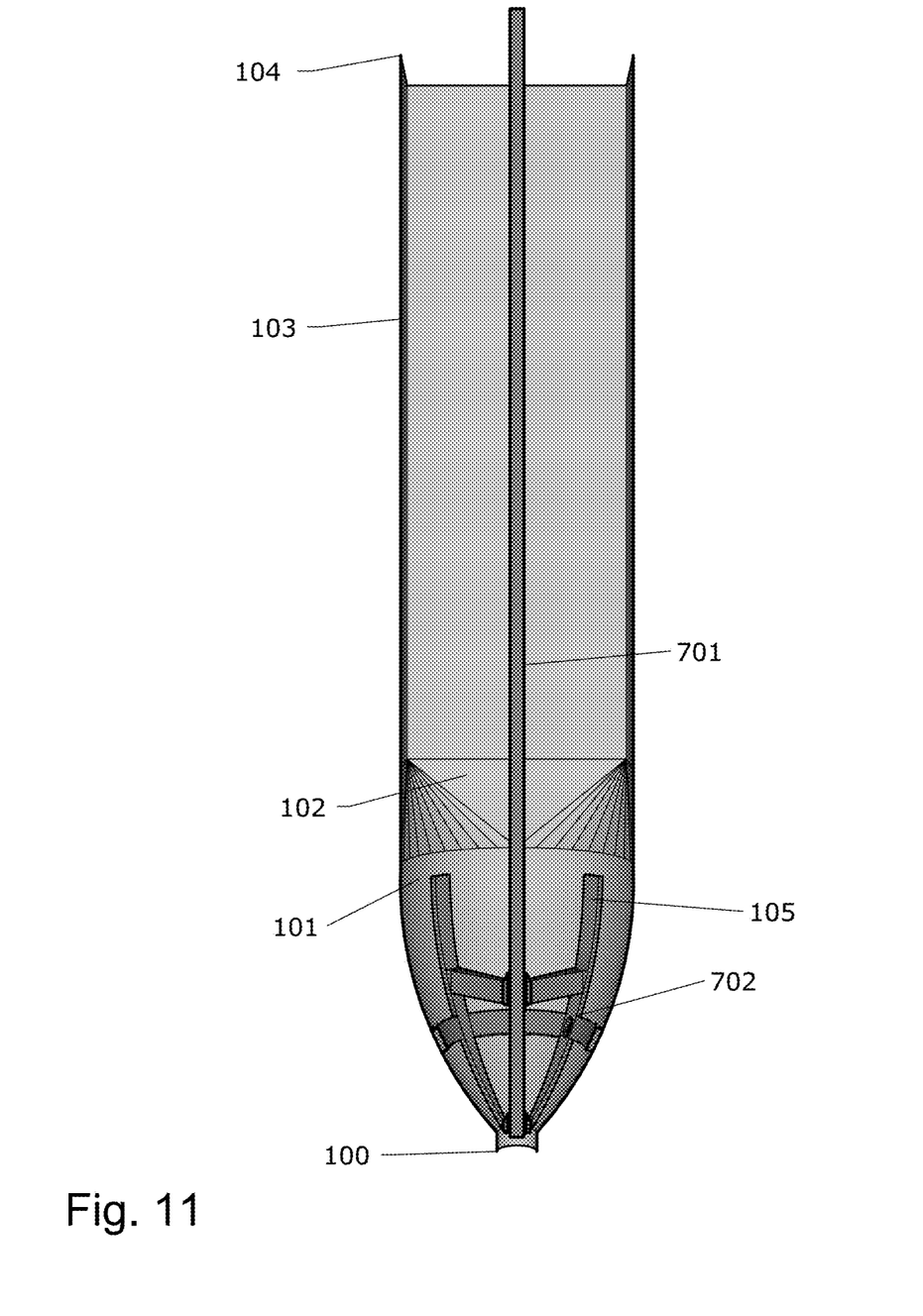
FIG. 11 illustrates a front sectional view of an example rectangular LES embodiment of the apparatus illustrated in FIG. 2 with the agitator shown.

FIG. 11 presents a side sectional view of the rectangular LES example embodiment HGT separator depicted in FIG. 3, with the agitator shown.

Figure 12:
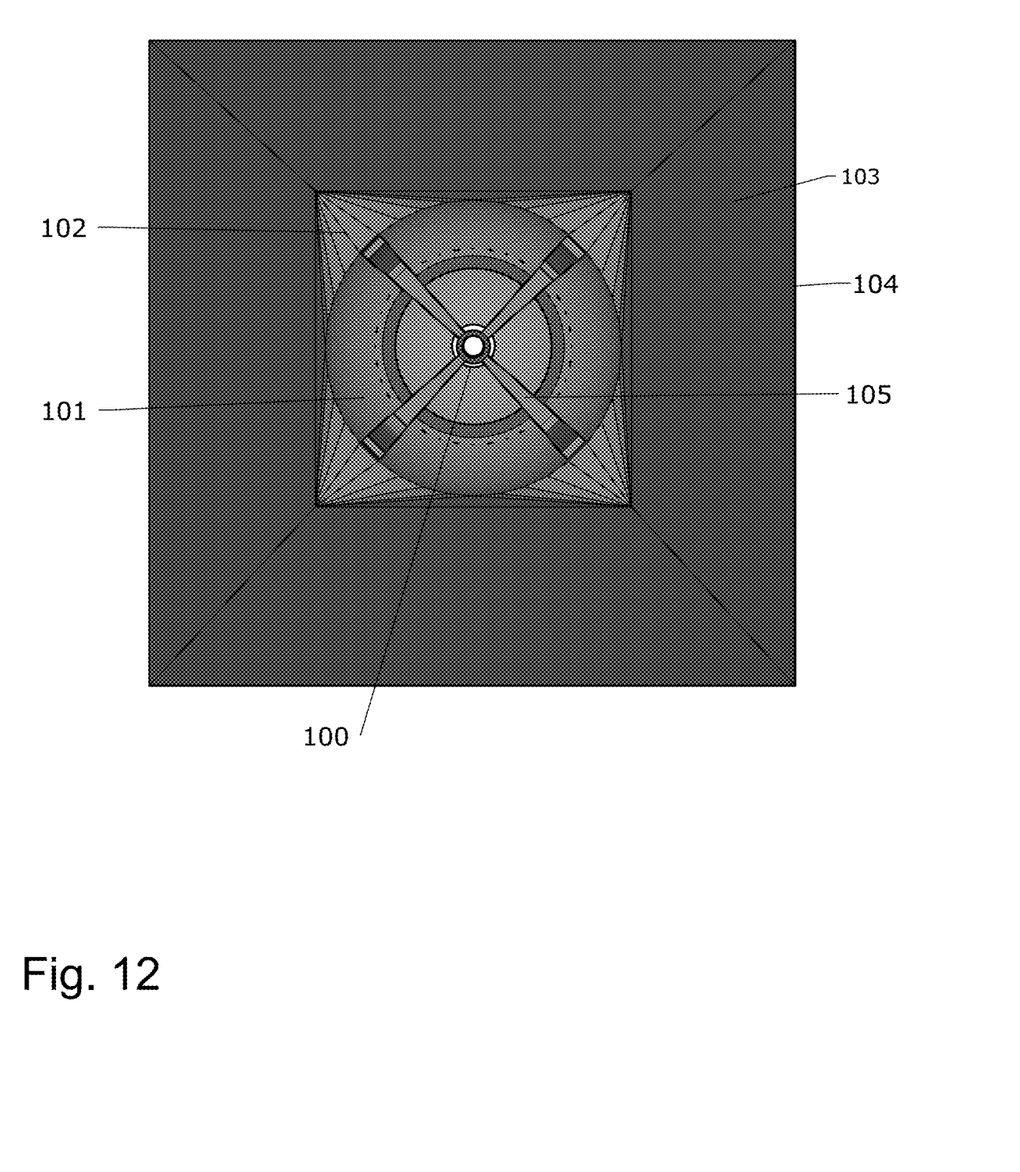
FIG. 12 illustrates a top view of an example rectangular LES embodiment of the apparatus illustrated in FIG. 2 with the agitator shown.

FIG. 12 presents a top view of the rectangular LES example embodiment HGT separator depicted in FIG. 3, with the agitator shown.

Figure 13:
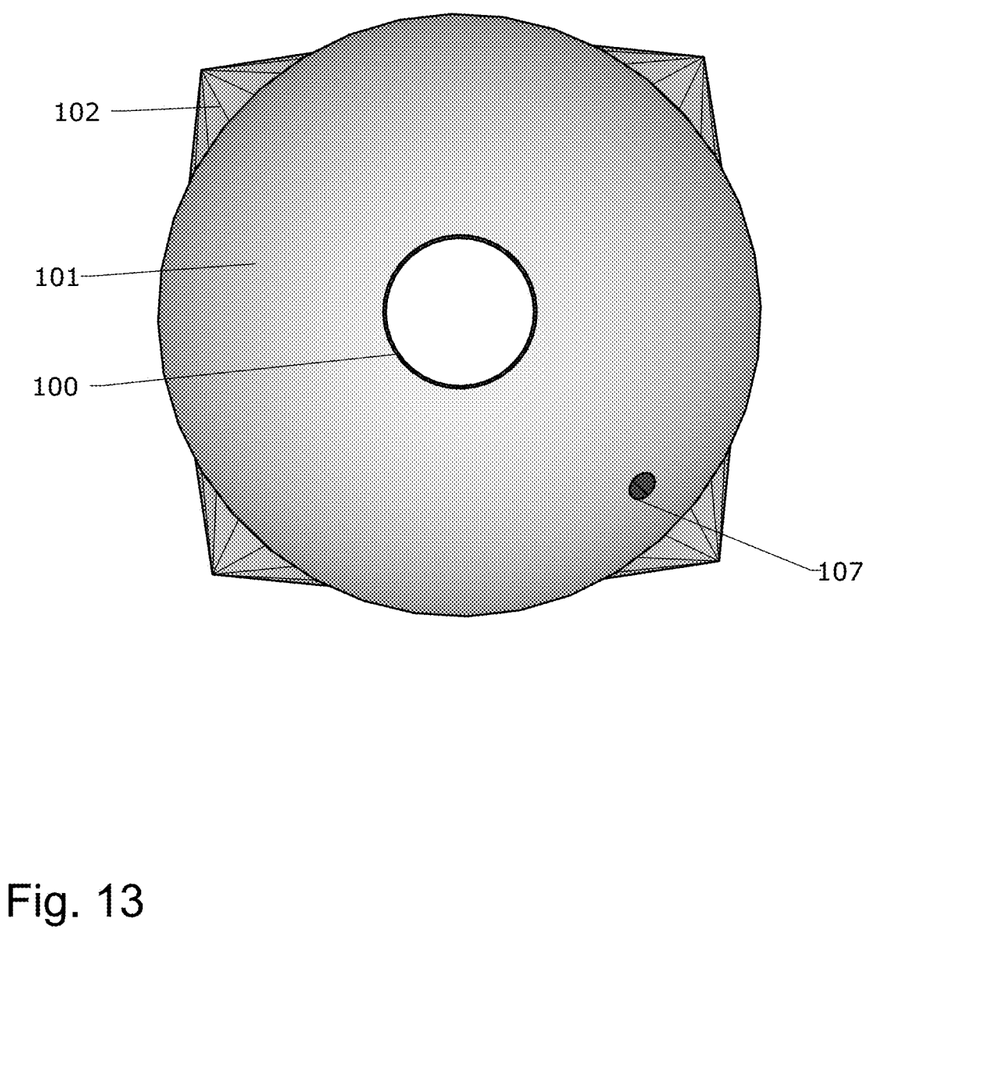
FIG. 13 illustrates a bottom view of an example rectangular LES embodiment of the apparatus illustrated in FIG. 2 with the agitator hidden.

FIG. 13 presents a bottom view of the rectangular LES example embodiment HGT separator depicted in FIG. 3, with the agitator hidden.

The HGT separator's description and its embodiments enable anyone skilled in the art to construct and operate the apparatus. Modifications to these embodiments should be apparent to those skilled in the art. The generic principles defined may be applied to other embodiments without departing from the spirit or scope of the invention. Thus, the embodiments presented include a scope consistent with the principles and novel features disclosed herein.

The word "comprising" indicates the inclusive sense in the claims and does not exclude other elements. The indefinite articles "a" or "an" before a claim feature does not exclude a plurality of the feature presented. Each of the individual features described here may be used in one or more embodiments and is not, by virtue of being represented here, to be construed as essential to all embodiments as defined by the claims.

SUMMARY

A hydro-gravitational trap (HGT) method and apparatus separate a suspension into two flow streams, concentrating designated particles in one of the flow streams. The HGT comprises a distinctive receptacle typically, but not necessarily, combined with an agitator to control fluid motion, energy, and particle transport. The receptacle comprises three distinct segments characterized by each segment's relative kinetic energy level. The High-Energy Segment (HES) receives the influent suspension and traps the designated particles. The HES upward kinetic energy, or surface overflow rate (SOR), prevents these particles from settling and provides orthokinetic motion promoting particle flocculation. An overlying and attached Transitional-Energy Segment (TES) initiates kinetic energy dissipation and, when necessary, provides structural transition. An overlying Low-Energy Segment (LES) completes energy dissipation and ensures particle separation from the flow field.

The apparatus receives an influent suspension at the base and produces a Designated Particle Concentrated (DPC) flow stream withdrawn from the HES and a Designated Particle Diluted (DPD) flow stream withdrawn from the top of the LES. Designated particles refer to particles with a flocculated settling velocity greater than the nominal LES SOR of the apparatus, determined by apparatus flowrate. The DPD flow stream proceeds from the entrance at the lowest point of the apparatus and passes through a region of increased designated particle concentration in the HES. The DPD flow stream sheds designated particles in this segment and proceeds through advection to exit the LES at the highest point.

In the HES, designated particles become trapped between the upward hydrodynamic field and the downward net gravitational field. An agitator typically conforming to the HES's divergent shape prevents accumulated particles from adhering to the HES, provides orthokinetic flocculation energy, and mixes the contents. In some embodiments, the agitator also serves as a control valve or actuator that regulates the DPC flow exiting the HES typically, although not necessarily, through a separate outlet. Configurations in which the influent pipe intermittently provides DPC flow stream withdrawal also could be beneficial. The overall mass balance determines the DPC concentration regulated by the DPC flow rate, providing one example method to operate the apparatus. Alternatively, an external valve, pump, or other means could control DPC flow in other embodiments.

As trapping concentrates designated particles in the HES, the resultant increased and controllable concentration decreases the interparticle distance (IPD), improving flocculation when possible and appropriate.

Parallel and stacked arrayed HGT configurations provide functionally efficient and spatially economical separation, particularly when retrofitted into existing basins. A single apparatus offers a representative and reproducible experimental method to determine the performance of an arrayed full-scale system to evaluate performance and assess design and operating parameters. The apparatus improves performance and increases capacity installed per required volume compared with existing suspension separation systems.

The invention claimed is:

1. A method for separating a suspension into two flow streams comprising:

feeding a fully entrained, particle-laden suspension, wherein the fully entrained, particle-laden suspension comprises a plurality of particles, wherein the plurality of particles comprises some particles designated for suspension, into an opening at the base of a receptacle such that an influent upward velocity exceeds the settling velocity of all the plurality of particles in the suspension;

increasing a flow-wise projected area of an overlying High-Energy Segment (HES) of said receptacle such that an average cross-sectional vertical fluid velocity decreases to equal that of the settling velocity of particles designated for separation;

trapping said particles designated for separation within said HES by balancing an upward hydrodynamic flow field with a downward gravitational field, resulting in a cessation of vertical transport of the particles designated for separation;

withdrawing said particles designated for separation in a Designated Particle Concentrated (DPC) flow stream directly from said HES;

extending the HES walls into an overlying Transitional-Energy Segment (TES) of the receptacle to dissipate energy, and when required, join the underlying HES perimeter to any perimeter shape desired in overlying segments;

extending said TES walls generally vertically into an overlying Low-Energy Segment (LES) of the receptacle to further dissipate energy and separate particles designated for separation from a flow field;

withdrawing a Designated Particle Diluted (DPD) flow stream from the top of said LES;

whereby the particles designated for separation concentrate in the DPC flow stream;

agitating the DPC within the HES using an agitator, the agitator conforming to an internal surface of the HES and having at least a portion in contact with the internal surface of the HES, rotating or reciprocating the agitator within the HES so as to prevent adhesion of particles to the internal surface;

controlling the DPC flow by the at least a portion of the agitator being in contact with the internal surface and the rotating or reciprocating of the agitator.

2. The apparatus of claim 1 wherein said agitator controls DPC flow as a valve or an actuator.

3. An apparatus for separating a suspension into two flow streams, comprising:

a multi-segment receptacle, having a base, an overlying High-Energy Segment (HES), an overlying Transitional-Energy Segment (TES), and an overlying Low-Energy Segment (LES); the multi-segment receptacle comprising:

an entry opening at the receptacle base and into the HES in fluid communication with an influent suspension sized such that all particles remain fully entrained in a flow field;

said HES overlying and attached to said entry opening and having a flow-wise projected area that increases from an inlet area to the top of said HES to produce a decreasing upflow velocity;

an exit opening in the HES in fluid communication with the HES contents for controlled withdrawal of a Designated Particle Concentrated (DPC) flow stream from said HES and sized such that all particles remained fully entrained in a flow field;

a TES overlying and attached to the HES to initialize energy dissipation; an LES overlying and attached to the TES to complete energy dissipation; a Designated Particle Diluted (DPD) flow stream exit at the top of the LES;

whereby particles that settle more rapidly than a designated velocity concentrate in the DPC flow stream;

an internal agitator conforming to an internal surface of the HES and having at least a portion in contact with the internal surface of the HES, the internal agitator can be rotated or reciprocated within the HES so as to prevent adhesion of particles to the internal surface;

wherein the internal agitator is operable to control a flow through the exit opening by the at least a portion of the internal agitator being in contact with the internal surface.

4. The apparatus of claim 3, in which a TES modifies the circumferential shape of a HES to a desired circumferential shape of an LES, facilitating HES attachment to the LES.

5. The apparatus of claim 3 wherein the HES has a conical shape.

6. The apparatus of claim 3 wherein the agitator comprises an opening in a blade portion in contact with the HES internal surface, the opening allowing the DPC flow stream to exit the exit opening when the agitator blade opening is aligned with the exit opening.

7. The apparatus of claim 3 wherein the agitator seals the DPC flow stream by covering the exit opening when in a first rotational or reciprocal position.

* * * * *